(12) United States Patent
Vuksan et al.

(10) Patent No.: US 9,405,802 B2
(45) Date of Patent: Aug. 2, 2016

(54) DATABASE SYSTEM AND METHOD

(75) Inventors: Mario Vuksan, Cambridge, MA (US);
Hrvoje Zeba, Slavonski Brod (HR);
Vedran Novoselac, Zagreb (HR)

(73) Assignee: ReversingLabs International, GmBH, Zurich (CH)

( * ) Notice: Subject to any disclaimer, the term of this patent is extended or adjusted under 35 U.S.C. 154(b) by 140 days.

(21) Appl. No.: 13/464,610

(22) Filed: May 4, 2012

(65) Prior Publication Data

US 2012/0310878 A1   Dec. 6, 2012

Related U.S. Application Data

(60) Provisional application No. 61/482,836, filed on May 5, 2011.

(51) Int. Cl.
*G06F 7/00* (2006.01)
*G06F 17/30* (2006.01)

(52) U.S. Cl.
CPC .... *G06F 17/30528* (2013.01); *G06F 17/30575* (2013.01)

(58) Field of Classification Search
CPC .............. G06F 17/30528; G06F 17/30864; G06F 17/30545; G06F 17/30575
USPC .......... 707/609, 707, 736, 769, 770, 999.004, 707/741, 758, 821
See application file for complete search history.

(56) References Cited

U.S. PATENT DOCUMENTS

| | | | |
|---|---|---|---|
| 8,738,668 B2 * | 5/2014 | Pendlebury et al. | 707/821 |
| 2003/0074352 A1 | 4/2003 | Raboczi et al. | |
| 2004/0024759 A1 * | 2/2004 | Dugan et al. | 707/4 |
| 2006/0161530 A1 * | 7/2006 | Biswal | G06F 17/30356 |
| 2008/0040359 A1 | 2/2008 | Arrouye et al. | |
| 2008/0301095 A1 * | 12/2008 | Zhu | G06F 17/30613 |
| 2009/0037431 A1 | 2/2009 | Martino et al. | |
| 2011/0022627 A1 * | 1/2011 | Mohan | 707/769 |
| 2011/0219008 A1 * | 9/2011 | Been | G06F 17/30 707/742 |

OTHER PUBLICATIONS

International Search Report and Written Opinion of the International Searching Authority mailed Jul. 13, 2012, received in PCT/US12/36606 (11 pgs.).
International Preliminary Report of Patentability for International Application No. PCT/US2012/036606 mailed on Nov. 14, 2013, 6 pages.
Extended European Search Report issued in corresponding Application No. 12779799.1 issued on Mar. 18, 2015.

* cited by examiner

*Primary Examiner* — Md. I Uddin
(74) *Attorney, Agent, or Firm* — Brian J. Colandreo; Michael T. Abramson; Holland & Knight LLP

(57) ABSTRACT

A method, computer program product, and computer system for a database system and method. In some embodiments, metadata associated with data stored in a non-relational database is generated. The metadata is based upon, at least in part, at least one of a location of the data, a state of data, and the data. The metadata is stored in a data structure in memory. A query for data stored in the non-relational database is received. The query is executed using the generated metadata to generate a metadata result set. A result set including data in the non-relational database is generated using the generated metadata result set.

16 Claims, 6 Drawing Sheets

DATABASE SYSTEM AND METHOD

CROSS-REFERENCE TO RELATED APPLICATION

This application claims the benefit of U.S. provisional patent application Ser. No. 61/482,836, filed on May 5, 2011, entitled "Database System and Method," the entire disclosure of which is incorporated herein by reference.

TECHNICAL FIELD

This disclosure relates to database management systems and methods, and more particularly, to database management systems and methods.

BACKGROUND

A database is a collection of organized data. One type of database includes a distributed database in which storage devices are not all attached to a common CPU. The data may be stored in multiple computers located in the same physical location or may be dispersed over a network of interconnected computers. A distributed database with multiple computers or storage devices may provide more storage. In some instances, having multiple computers or storage devices may negatively impact retrieval time of data from the various computers or storage devices.

BRIEF SUMMARY

In one implementation, a computer-implemented method includes a computing device generating metadata associated with data stored in a non-relational database, the metadata based upon, at least in part, at least one of a location of the data, a state of data, and the data. The computing device stores the metadata in a data structure in memory. The computing device receives a query for data stored in the non-relational database. The computing device executes the query using the generated metadata to generate a metadata result set. The computing device generates a result set including data in the non-relational database using the generated metadata result set.

One or more of the following features may be included. Generating the result set including data in the non-relational database may include retrieving the data in the non-relational database from one or more devices using the metadata result set. The generated metadata may be inspected for updates. The data stored in the non-relational database may be updated based upon, at least in part, the updates of the generated metadata. The generated metadata may include one or more full text indexes of the data stored in the non-relational database. The query may be received over a switched fabric communication link. The data may be transferred to a shard of the non-relational database on a second computing device. Metadata of the transferred data may be generated. A database schema associated with a first instance of the non-relational database may be stored to a file. A second instance of the non-relational database may be generated based upon the database schema.

In one implementation, a computer program product residing on a computer readable medium has a plurality of instructions stored on it. When executed by a processor, the plurality of instructions cause the processor to perform operations including generating metadata associated with data stored in a non-relational database, the metadata based upon, at least in part, at least one of a location of the data, a state of data, and the data. The metadata is stored in a data structure in memory. A query for data stored in the non-relational database is received. The query is executed using the generated metadata to generate a metadata result set. A results set including data in the non-relational database is generated using the generated metadata result set.

One or more of the following features may be included. Generating the result set including data in the non-relational database may include retrieving the data in the non-relational database from one or more devices using the metadata result set. The generated metadata may be inspected for updates. The data stored in the non-relational database may be updated based upon, at least in part, the updates of the generated metadata. The generated metadata may include one or more full text indexes of the data stored in the non-relational database. The query may be received over a switched fabric communication link. The data may be transferred to a shard of the non-relational database on a second computing device. Metadata of the transferred data may be generated. A database schema associated with a first instance of the non-relational database may be stored to a file. A second instance of the non-relational database may be generated based upon the database schema.

In one implementation, a computing system including a processor and memory configured to perform operations includes generating metadata associated with data stored in a non-relational database, the metadata based upon, at least in part, at least one of a location of the data, a state of data, and the data. The metadata is stored in a data structure in memory. A query for data stored in the non-relational database is received. The query is executed using the generated metadata to generate a metadata result set. A results set including data in the non-relational database is generated using the generated metadata result set.

One or more of the following features may be included. Generating the result set including data in the non-relational database may include retrieving the data in the non-relational database from one or more devices using the metadata result set. The generated metadata may be inspected for updates. The data stored in the non-relational database may be updated based upon, at least in part, the updates of the generated metadata. The generated metadata may include one or more full text indexes of the data stored in the non-relational database. The query may be received over a switched fabric communication link. The data may be transferred to a shard of the non-relational database on a second computing device. Metadata of the transferred data may be generated. A database schema associated with a first instance of the non-relational database may be stored to a file. A second instance of the non-relational database may be generated based upon the database schema.

In one implementation, a computer-implemented method includes a computing device generating metadata associated with data stored in a database, the metadata based upon, at least in part, at least one of a location of the data, a state of data, and the data. The computing device stores the metadata in a data structure. The computing device receives a query for data stored in the database. The computing device executes the query using the generated metadata to generate a metadata result set. The computing device generates a result set including data in the database using the generated metadata result set.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
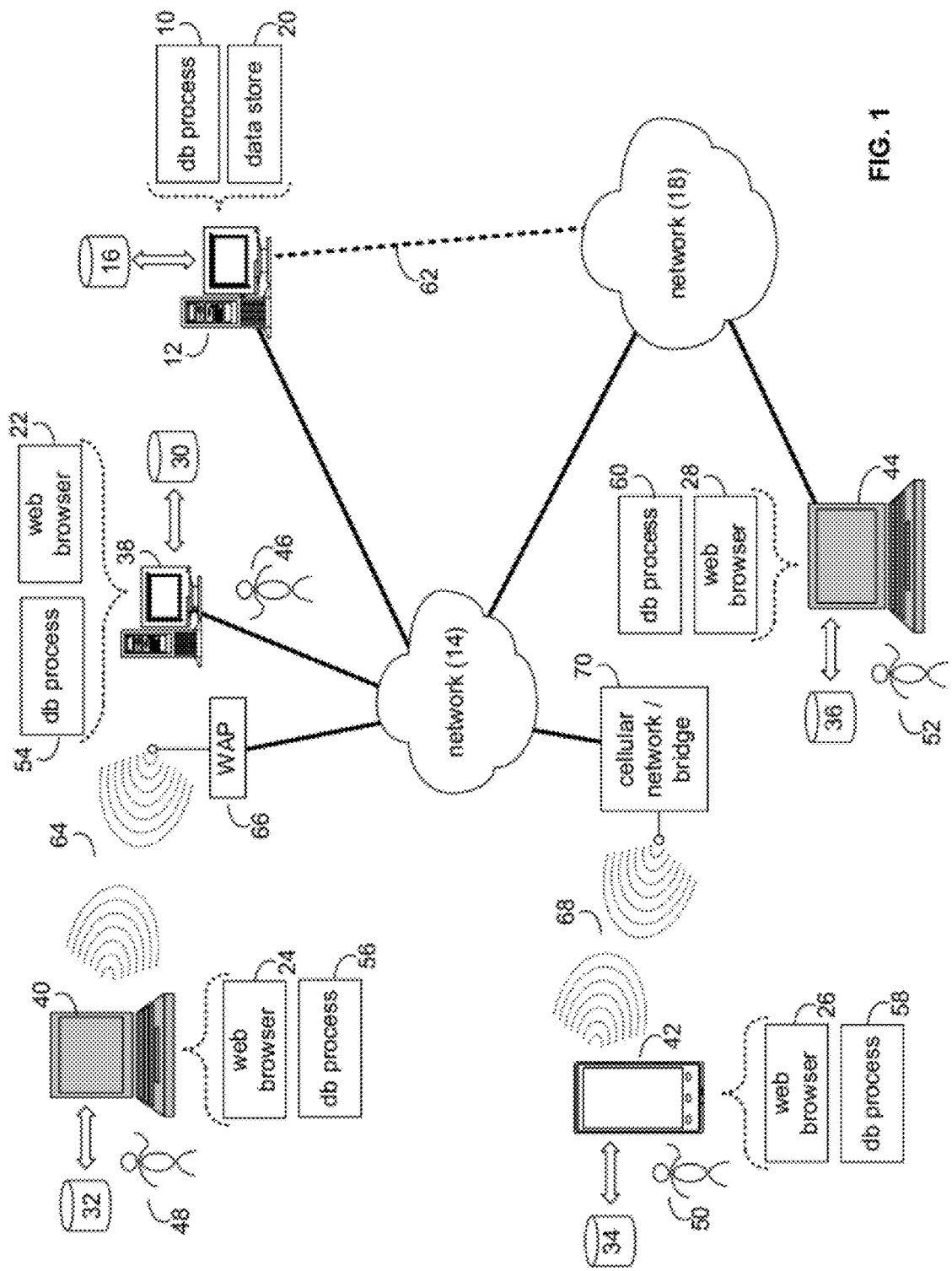
FIG. 1 is a diagrammatic view of a DB process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown DB process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the DB process 10 may reside on and be executed, in whole or in part, by a client electronic device, such as a personal computer, notebook computer, personal digital assistant, or the like.

As will be discussed below in greater detail, DB process 10 may generate metadata associated with data stored in a non-relational database. The metadata may be based upon, at least in part, at least one of a location of the data, a state of data, and the data. DB process 10 may store the metadata in a data structure in memory. DB process 10 may receive a query for data stored in the non-relational database. DB process 10 may execute the query using the generated metadata to generate a metadata result set. DB process 10 may generate a result set including data in the non-relational database using the generated metadata result set.

The instruction sets and subroutines of DB process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute a data store application (e.g., data store application 20), examples of which may include, but is not limited to e.g., a non-relational database. Data store application 20 may include/maintain data that may be requested by a client web browser application (e.g., web browsers 22, 24, 26, 28) via a query. Examples of web browsers 22, 24, 26, 28 may include, but are not limited to, e.g., Microsoft Internet Explorer®, Apple® Safari®, etc. (Internet Explorer is a registered trademark of Microsoft Corporation in the United States, other countries, or both, and Apple and Safari are registered trademarks of Apple Inc. in the United States, other countries, or both).

DB process 10 may be a standalone application, or may be an applet/application/script that may interact with and/or be executed within data store application 20. In addition/as an alternative to being a server-side process, DB process 10 may include a client-side process (described below) that may reside on a client electronic device (described below) and may interact with a web browser (e.g., one or more of web browsers 22, 24, 26, 28). Further, DB process 10 may be a hybrid server-side/client-side process that may interact with data store application 20 and a web browser (e.g., one or more of web browsers 22, 24, 26, 28). As such, DB process 10 may reside, in whole, or in part, on server computer 12 and/or one or more client electronic devices.

The instruction sets and subroutines of data store application 20, which may be stored on storage device 16 coupled to server computer 12 may be executed by one or more processors (not shown) and one or more memory modules (not shown) incorporated into server computer 12.

The instruction sets and subroutines of web browsers 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, net book, or the like), notebook computer 44, for example. Using web browsers 22, 24, 26, 28, users 46, 48, 50, 52 may access web content (e.g., web pages, web applications, and the like) via one or more of networks 14, 18. Additionally, using web browsers 22, 24, 26, 28, users 46, 48, 50, 52 may request data included in/maintained by data store application 20 by transmitting one or more queries to DB process 10.

As mentioned above, DB process 10 may reside, in whole or in part, on a client electronic device (e.g., client electronic device 38, 40, 42, 44). For example, client electronic devices 38, 40, 42, 44 may respectively execute a client-side DB process (e.g., DB processes 54, 56, 58, 60). DB processes 54, 56, 58, 60 may each include a standalone application, or may be an applet/application/script that may interact with and/or be executed within web browsers 22, 24, 26, 28. The instruction sets and subroutines of DB processes 54, 56, 58, 60, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively).

As will be discussed in greater detail below, the client-side DB process (e.g., DB processes 54, 56, 58, 60), alone or in conjunction with a web browser, may generate and transmit a query for retrieval of data from the database. The query for data may be transmitted to a data store (e.g., data store 20) via a network. A result set may be generated using metadata generated by DB process 10 for quick retrieval of data.

Users 46, 48, 50, 52 may access data store application 20 directly through the device on which the web browser (e.g., web browsers 22, 24, 26, 28) is executed, namely client electronic devices 38, 40, 42, 44, for example. Users 46, 48, 50, 52 may access data store application 20 directly through network 14 or through secondary network 18. Further, server computer 12 (i.e., the computer that executes scheduling application 20) may be connected to network 14 through secondary network 18, as illustrated with phantom link line 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 64 established between laptop computer 40 and wireless access point (i.e., WAP) 66, which is shown directly coupled to network 14. WAP 66 may be, for example, an IEEE 802.11a, 802.11b, 802.11g, Wi-Fi, EDGE, 3G, Wi-MAX and/or Bluetooth device that is capable of establishing wireless communication channel 64 between laptop computer 40 and WAP 66. Mobile computing device 42 is shown wirelessly coupled to network 14 via wireless communication channel 68 established between mobile computing device 42 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

For the purpose of the following description, web browser 22 and DB application 54 may be discussed. However, this is for illustrative purposes only and should not be construed as a limitation of the present disclosure, as other web browsers (e.g., web browsers 24, 26, 28) and other DB processes (e.g., DB processes 56, 58, 60) may be equally utilized.

As discussed above and referring also to FIGS. 2-3, DB process 10 may generate metadata of data stored in a non-relational database to be used to query the data, wherein the metadata is based upon, at least in part, at least one of a location of the data, a state of data, and the data. DB process 10 may store the metadata in memory. DB process 10 may receive a query for data stored in the non-relational database. DB process 10 may execute the query using the generated metadata stored in the memory. DB process 10 may generate a result set chosen from the data in the non-relational database using the executed query.

Figure 2:
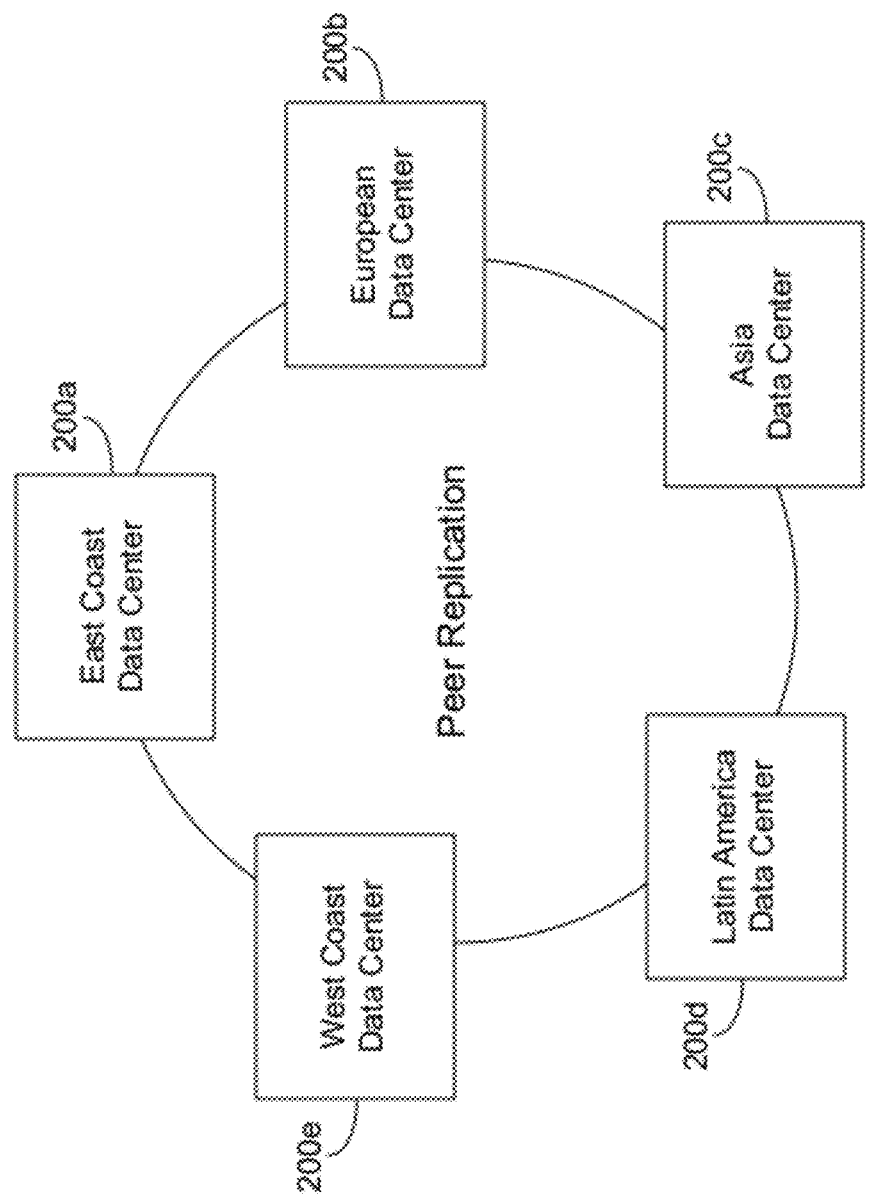
FIG. 2 is a diagrammatic view of one embodiment of distributed data centers.

Now referring to FIG. 2, one embodiment of distributed data centers 200 is depicted. In some embodiments, the distributed data centers 200a, 200b, 200c, 200d, 200e (collectively 200) may be located in different geographic regions and communicate with individuals located in the geographic region. For example, European Data Center 200b may be located in Europe and may be accessed by users in and around Europe. Although users may access their regional data centers 200, the data stored and available to the users may be stored in other geographic locations. Each data center 200 may be associated with one or more storage devices. In some embodiments, collections of data may be distributed across multiple physical devices. The multiple physical devices may be located in a single geographic area or may be distributed in multiple physical locations. The distributed data centers 200 may reside on network servers on the Internet, on corporate intranets or extranets, or on other company networks. In some embodiments, to ensure proper back up, data centers may include replications or duplications of data.

Figure 3:
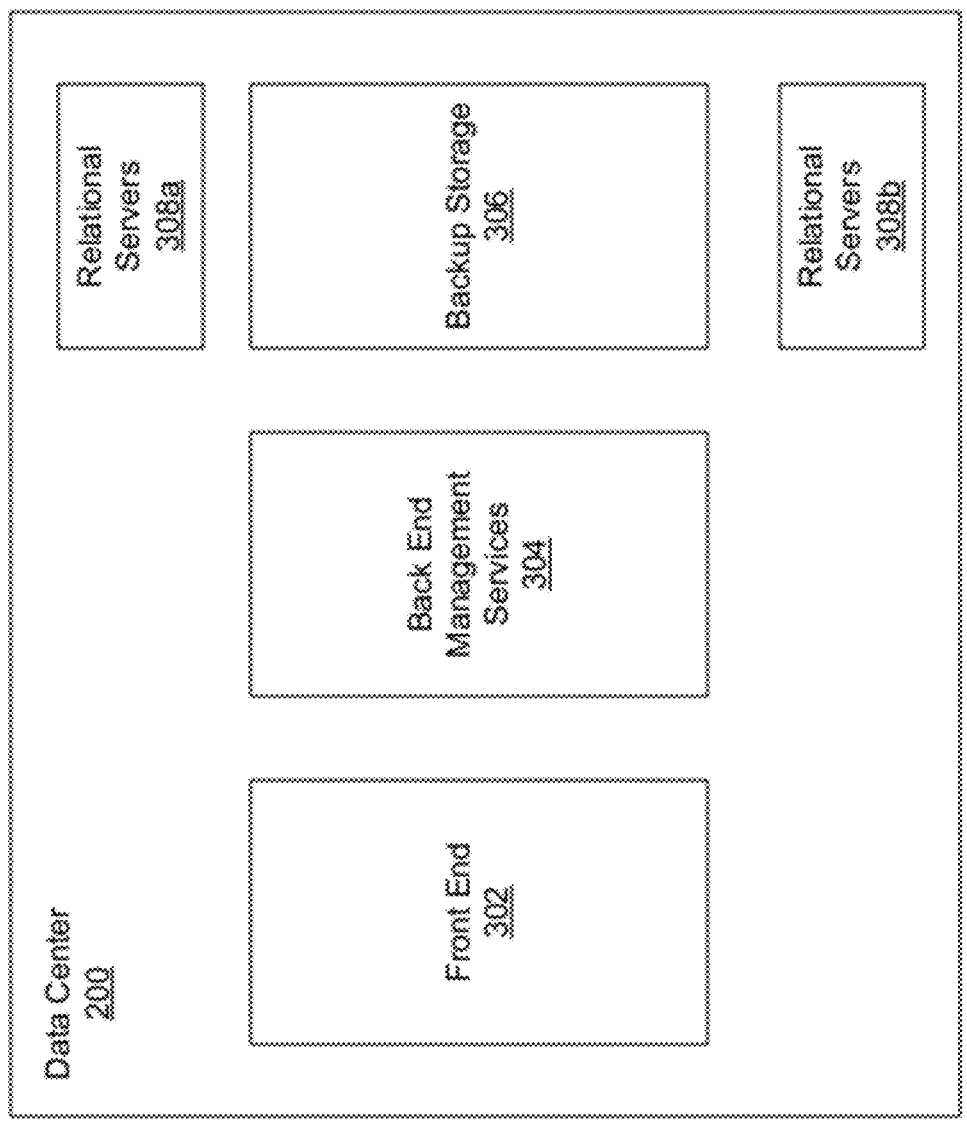
FIG. 3 is a diagrammatic view of one embodiment of a data center.

Now referring to FIG. 3, one embodiment of data center 200 is depicted. In brief overview, the data center 200 may include front end 302, back end management services 304, back up storage 306, and relational servers 308a, 308b (collectively referred to as 308). In some embodiments, data center 200 may be multiple physical devices. In some embodiments, data center 200 may be a single device. In some embodiments, devices associated with or in the data center may be in different physical locations.

Front End 302 may be a server or other computing device. Front End 302 may track the location and paths to data. In some embodiments, Front End 302 may identify and/or track which devices include database shards in which the data resides. A database shard may be a horizontal partition in a database. In some embodiments, database shards are derived from a database architecture in which rows of a database table are help separately. Each horizontal partition in a database may be located on a separate database server, data center 200, or physical location.

Back End Management Services 304 may be a database engine with storage. In some embodiments, Back End Management Services 304 may be a high performance server that manages data blocks, extracting data from raw disk space. In some embodiments, DB process 10 may reside in and/or be associated with Back End Management Services 304. Back End Management Services 304 may be a server that manages data. In some embodiments, data management may include extracting data from database shards, disk space, or other storage mechanism used by the database. In some embodiments, Back End Management Services 304 may read/write/merge data. Back End Management Services 304 may implement decisions regarding data storage initiated by Front End 302. Decisions regarding data storage initiated by Front End 302 may include determining where to store data imported from other databases or other organization means, load-balancing of the data, wherein database shards may be transferred or moved from one physical device or location to another. DB process 10, in association with Back End Management Services 304, may use algorithms or other tools to determine the most efficient retrieval paths for data and transmit the information to Front End 302.

Backup Storage 306 may include one or more computing devices. Backup Storage 306 may be located in a single physical location or may be located in a different physical location. In some embodiments, Backup Storage 306 may be connected to Data Center 200 over a network 14. In some embodiments, Backup Storage 306 may initiate duplication of data associated with the Data Center 200. In some embodiments, Backup Storage 306 may initiate duplication of data from one or more other Data Centers 200. In some embodiments, data backups and/or duplication of data may be initiated at set time intervals. In some embodiments, the time intervals may be determined by an administrator of the system. In some embodiments, data duplication and/or data backup may occur in real-time or near real-time as updates made to the data in the database. For instance, in some embodiments, when a change is made in the database, updates may be made to the data stored in Backup Storage 306.

In some embodiments, Data Center 200 may include Relational Servers 308a, 308b (collectively 308). Relational Servers 308 may be one or more computing devices. Relations Servers 308 may be sources for import and/or export of data to a different known database type. In some embodiments, it may be used to use a referential data set to bring the data into a relational database, such as a SQL database.

Figure 4:
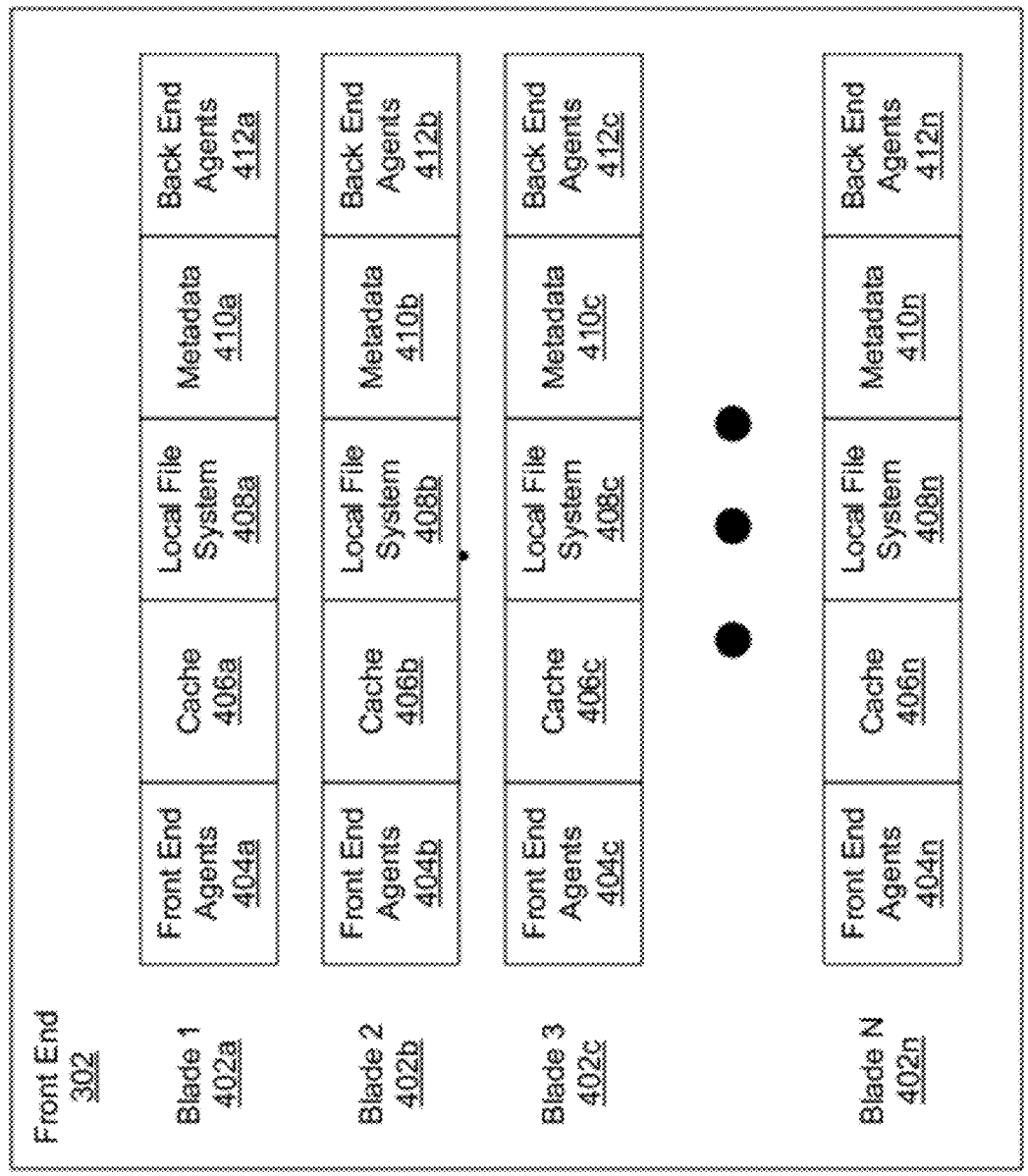
FIG. 4 is a diagrammatic view of one embodiment of a front end.

Now referring to FIG. 4, one embodiment of front end 302 may comprise multiple blades 402. Each blade 402 may include front end agent 404, cache 406, local file system 408, metadata 410, and backend agent 412.

In some embodiments, front end agent 404 may provide access to the data in the database system. Front end agent 404 may be used to authenticate and verify user access. In some embodiments, front end agent 404 may be used to determine which users have access to different types of data or particular devices that may store the date.

In some embodiments, cache 406 may be used for additional acceleration to access. For example, if users are requesting the same records of data multiple times, the data may be locally stored in the cache 406 on the blade 402. This may increase efficiency as the database system may not need to be accessed each time the data was requested. In some embodiments, the data stored in the cache 406 may be updated periodically to ensure the data available to users is the most current version of the data.

In some embodiments, local file system 408 may be local storage used to store information on the blade. In some embodiments, local file system 408 may be an existing format type. For example, the local file system 408 may be Fusion IO. In some embodiments, blades 402 may have different local file system 408 formats.

In some embodiments, metadata 410 may be indexes. In some embodiments, metadata may be simple indexes such as hash values indicating location of information on a particular blade. In some embodiments, metadata may include ordered lists of date and/or time stamps, file names, and domain names that may be used to find data in the database. In some embodiments, metadata may be stored in the front end 302. In some embodiments, metadata may be stored in memory. In some embodiments, metadata may be stored in the database. In some embodiments, the metadata may be stored partially in memory and partially in the database. In some embodiments, metadata may be stored on a storage device.

In some embodiments, backend agent 412 may manage other non-retrieval processes. For example, backend agent 412 may handle operations such as replication of data, coordination of replication jobs between blades 402 or other servers, import/export of data. One function of backend agent 412 may be to support for the database system and handling organizational and coordination tasks.

Figure 5:
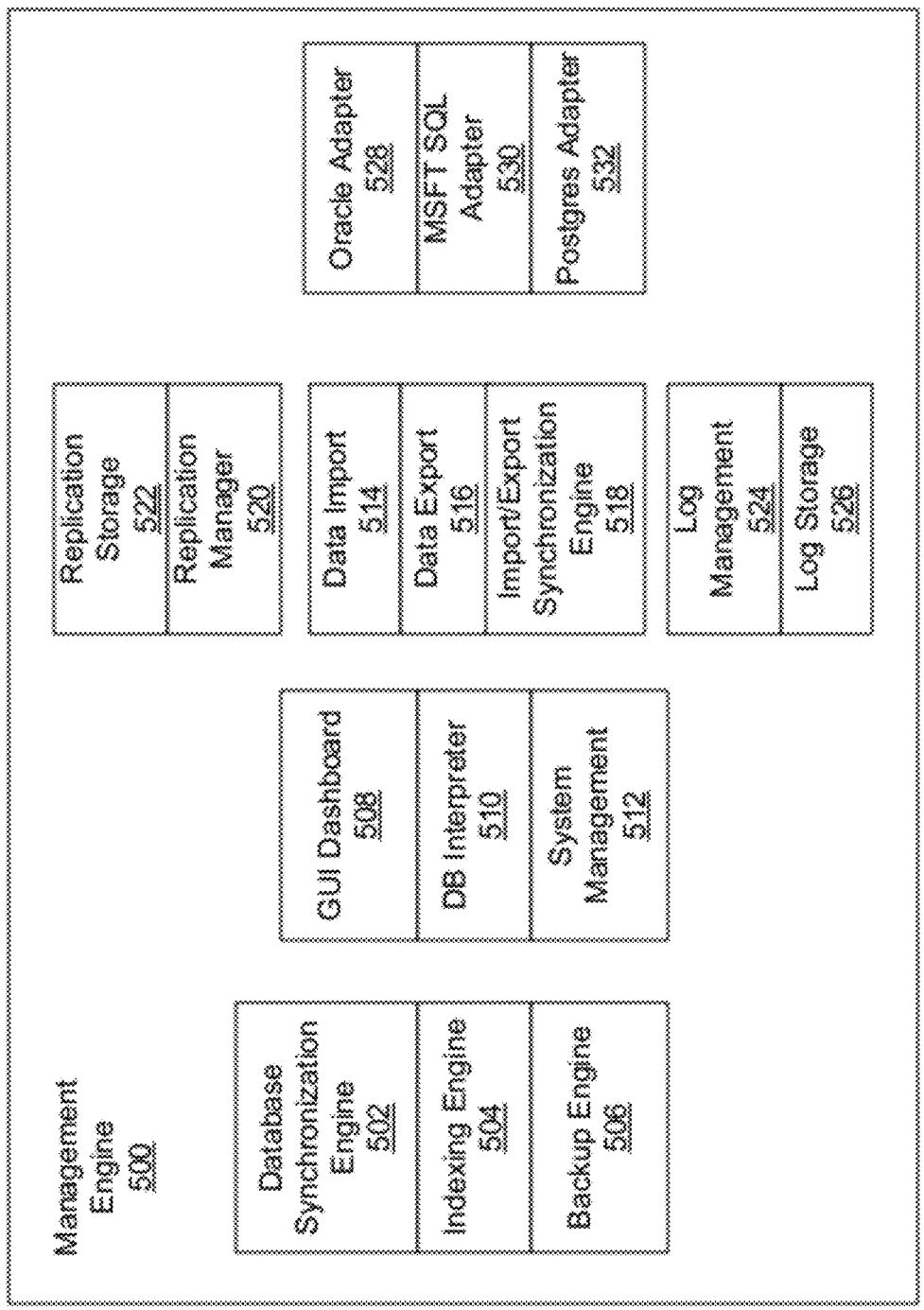
FIG. 5 is a diagrammatic view of one embodiment of a management engine.

Now referring to FIG. 5, one embodiment of management engine 500 is depicted. Management engine 500 may include database synchronization engine 502, indexing engine 504, backup engine 506, GUI dashboard 508, DB interpreter 510, system management 512, data import 514, data export 516, import/export synchronization engine 518, replication manager 520, replication storage 522, log management 524, log storage 526, Oracle adapter 528, MSFT SQL adapter 530, and postgres adapter 532.

In some embodiments, management engine 500 may manage record and/or metadata updates by enabling a single writer/multiple reader approach which enables queued updates on metadata. In some embodiments, pre-computed query indexes or metadata are updated for created/modified/deleted records by queuing such requests on a designated engine or component of the non-relational database management system.

In some embodiments, management engine 500 may include database synchronization engine 502. A database synchronization engine 502 may synchronize different parts of internal system and data chunks. For example, database synchronization engine 502 may update data stored in local cache 406 when data in the database has been modified or updated by a user.

In some embodiments, indexing engine 504 and/or DB process 10 may generate and organize metadata. Metadata may include indexes as well as location and path to data and may be stored on blades at 410. In some embodiments, indexing engine 504 may be easily distributable. Indexing engine 504 may have a low memory footprint in working sets. In some embodiments, indexing engine 504 may provide query pre-computation close to the hardware level instead of computation on the higher software architecture levels. In some embodiments, metadata generated by indexing engine 504 may combine metadata or indexes by means of low level bitwise operations. In some embodiments, combining metadata or indexes may be responsive to a receive query and/or query execution. In some embodiments, indexing engine 504 may support various logical operators for multiple sets of metadata (e.g., AND, OR, XOR).

In some embodiments, management engine 500 may include backup engine 506. Backup engine 506 may include similar elements of database synchronization engine 502, but may be used to generate stateful replicas of data. The stateful replicas of data may be stored in backup storage 306 or other storage device. In some embodiments, stateful replicas of data may be transferred to different physical devices or other data centers 200.

In some embodiments, GUI dashboard 508 may be a web interface. In other embodiments, GUI dashboard 508 may be a part of a stand-alone application. GUI dashboard 508 may provide the ability to monitor the behavior and performance of the non-relational database system. Some metrics that may be provided to GUI dashboard 508 may include number of queries, types of queries, users requesting data, throughput to and from one or more physical devices.

In some embodiments, DB interpreter 510 may be a SQL interpreter. In some embodiments, DB interpreter 510 may provide the ability to receive SQL queries or commands and translate them into queries that may be compatible with a non-relational or noSQL database.

In some embodiments, management engine 500 may include system management 512. System management 512 may provide the ability of the non-relational database management system to rebalance data within the non-relational database. In some embodiments, system management 512 may provide GUI dashboard 508 data to be displayed. System management 512 monitors and maintains activities within and associated with the non-relational database, include access of the non-relational database by users, number of queries executed, throughput of the physical devices of the system, and other metrics of the non-relational database.

In some embodiments, management engine 500 may include data import 514 and data export 516 that may be imported and/or exported in the non-relational database. Import/export synchronization engine 518 may drive the data import and data export. In some embodiments, import/export synchronization engine 518 may perform integrity checks of the data as it is being imported into and/or exported out of the non-relational database. Import/export synchronization engine 518 may ensure that relevant events have been captured and may replicate data being imported/exported to different a different database.

In some embodiments, management engine 500 may include a replication manager 520. The replication manager 520 may utilize replication techniques to replicate a portion, section or the entire database. In some embodiments, the replication may be stored to replication storage 522.

In some embodiments, management engine 500 may include log management 524. Log management 524 may track data, states of data, relocation of data, and other actions that may be associated with data. In some embodiments, log management 524 may track access of the non-relational database by users, frequency of access, location of access and the like. Log management 524 may generate logs of the information tracked and may stored them to log storage 526.

In some embodiments, management engine 500 may include Oracle adapter 528, MSFT SQL adapter 530, or postgres adapter 532. In some embodiments, adapters for other non-relational database management systems. The adapters may permit data that has been created, managed, stored, and manipulated by other database management systems and convert them into a format that is recognized by the non-relational database of the data center 200. Data may be imported from an external database of a different format. An adapter (e.g., Oracle adapter, MSFT SQL adapter, postgres adapter) may be used to convert the data in the external database to one that is compatible with the non-relational database associated with the data center 200.

Figure 6:
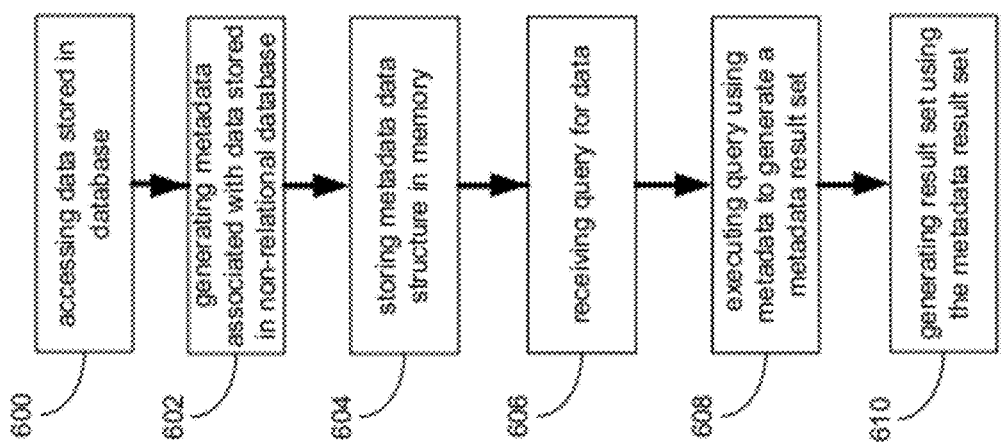
FIG. 6 is a flowchart of the DB process of FIG. 1.

Now referring to FIG. 6, DB process 10 may access 600 data stored in a non-relational database. DB process 10 may generate 602 metadata of data stored in non-relational database. DB process 10 may store 604 the metadata in memory. DB process 10 may receive 606 a query for data from the non-relational database. DB process 10 may execute 608 the query using the metadata to generate a metadata result set. DB process 10 may generate 610 a result set using the metadata result set.

DB process 10 may access 600 data stored in a non-relational database. In some embodiments, DB process 10 may access 600 data stored in one or more data stores associated with the non-relational database. The data stores may reside on a single device or across multiple devices. In some embodiments, DB process 10 may shard one or more tables storing the data across multiple instances of a database schema. In some embodiments, sharding may include horizontally partitioning a database. In some embodiments, sharding may include storing the multiple resulting shards or database partitions across multiple servers or computing devices. The multiple instances of the database schema may reside on one or more computing devices.

DB process 10 may generate 602 metadata associated with data stored in the non-relational database. In some embodiments, DB process 10 may generate metadata of the data stored in the non-relational database. In some embodiments, the indexing engine 504 may generate the metadata of the data. In some embodiments, the metadata generated from the data may mimic columnar database aspects. Metadata may be generated based upon, at least in part, a location and state of data. In some embodiments, metadata may be generated based upon, at least in part, the data. In some embodiments, the metadata generated may be indexes of and/or to the data. A database index may be a data structure that may be used for rapid random lookups and efficient access of ordered records. In some embodiments, DB process 10 may generate metadata that is represented in numeric form. In some embodiments, DB process 10 may generate metadata that is in full text or string form.

The full text metadata may be partially stored in memory, partially stored in the database, and/or partially stored on one or more physical devices. In some embodiments, metadata may be stored in memory. In some embodiments, metadata may be stored in the database. In some embodiments, the metadata may be stored partially in memory and partially in the database. In some embodiments, metadata may be stored on a storage device. In some embodiments, DP process 10 may use a 64-bit token and/or document identification system. In some embodiments, the full text metadata may be stored in the distributed non-relational database. In some embodiments, storing the full text metadata may enable the physical device on which it resides the ability to do its own processing which may increase throughput of the non-relational database. In some embodiments, full text integration for generating full text metadata may utilize the non-relational database for storage of the metadata or indexes. The full text integration may be integrated with a relational database engine, which may use the non-relational database as storage. In some embodiment, all the data (metadata and data in the database) may be available from a single source. In some embodiments, data may be written on unused space on disk and the readers of the data may be locked out only to update the meta-data stored in memory.

In some embodiments, DB process 10 and/or indexing engine 504 may continuously generate indexes. In some embodiments, DB process 10 and/or indexing engine 504 may, in real-time or near real-time, generate and/or regenerate the metadata. In some embodiments, the generation may be in response to any change or updates made to the data stored in the database. DB process 10 may inspect the generated metadata for updates. DB process 10 may update the data stored in the non-relational database based upon, at least in part, the updates of the generated metadata.

In some embodiments, using a metadata for ad-hoc queries may result in high concurrency for reads/writes to the non-relational database. Regardless of the query complexity, DB process 10 may provide efficient and constant retrieval rates regardless of the size of the non-relational database.

DB process 10 may store 604 the metadata in a data structure in memory. In some embodiments, the data structure may be a table, array, list, tree, hash, or other means of storing data. In some embodiments, DB process 10 and/or indexing engine 504 may store the generated metadata in front end 302. In some embodiments, the metadata may be stored to cache 406 of a blade of front end 302. In some embodiments, the metadata may be stored to metadata storage 410. By storing the metadata to memory, either in cache 406 or in metadata storage 410 in the front end 302, DB process 10 may rapidly retrieve data without searching the entire non-relational database, which in some embodiments, may include multiple servers on which the non-relational database may reside.

DB process 10 may receive 606 a query for data from the non-relational database. In some embodiments, a query may be generated by DB process 54, 56, 58, 60. In some embodiments, the query may be generated by DB process 54, 56, 58, 60 via web browsers 22, 24, 26, 28. The query generated may be a query string. In some embodiments, the query generated may be a data structure. Client side DB process 54, 56, 58, 60 may transmit the query to DB process 10. In some embodiments, the query may be received over a switched fabric communication link. An example of a switched fabric communication link may include, but is not limited to, Infiniband.

DB process 10 may execute 608 the query using the metadata to generate a metadata result set. In some embodiments, DB process 10 may convert a received query string into a query. DB process 10 may execute the query using the stored metadata to generate 608 a result set. The metadata may include information regarding the location and path of the identified data. In some embodiments, DB process 10 executes the query using only the metadata of the data stored in the non-relational database. In some embodiments, DB process 10 may generate a metadata result set responsive to executing the query. The metadata result set may include metadata indicating the data relevant to the query, location of the data in the non-relational database, and/or a path to the identified data in the non-relational database.

DB process 10 may generate 610 a result set using the metadata result set. DB process 10 may use the metadata result set to retrieve the identified data from the location and using the path indicated in the metadata. Generating 610 the result set of data from the non-relational database may include retrieving the data in the non-relational database from one or more devices. In some embodiments, the data may be retrieved from one or more shards of the non-relational database. In some embodiments, the data may be retrieved from one or more computing devices.

DB process 10 may transmit the result set. In some embodiments, DB process 10 may transmit a preliminary result set to the requesting client. In some embodiments, the result set may comprise links to the data stored in the data base. In some embodiments, the result set may include copies of the identified data. In some embodiments, the result set may be transmitted over a switched fabric communication link. An example of a switched fabric communication link may include, but is not limited to, Infiniband.

DB process 10 may store a database schema in a first instance of the non-relational database to a file. DB process 10 may replicate the database schema in a second instance of the non-relational database using the file. A database schema of a database system may refer to the organization of data to create a blueprint of how a database should be constructed. In some embodiments, data may replicate database schemas between instances of the non-relational database by storing the binary data (of the communication between client devices and the non-relation database) to a file which can be replayed on another instance.

In some embodiments, the non-relational database management system may include a full text index implementation. The full text index implementation may use a 64-bit token or document ID system for scalability. In some embodiments, the full text index implementation may use the non-relational database to store data which may enable computers to do its own processing which may increase throughput.

Although this disclosure describes non-relational databases, the methods and systems described herein may also be applied to relational databases, SQL databases, and/or any type or architecture of database. In some embodiments, the methods and systems described herein may be applied to one or more databases of different types, sizes, architectures, and the like.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    generating, by a computing device, metadata associated with data stored in a non-relational database, the metadata based upon, at least in part, at least one of a location of the data, a state of data, and the data;
    storing, by the computing device, the generated metadata in a data structure in memory;
    inspecting, by the computing device, the generated metadata for updates;
    updating, by the computing device, the data stored in the non-relational database based upon, at least in part, the updates of the generated metadata;
    receiving, by the computing device, a query for data stored in the non-relational database;
    executing, by the computing device, the query using the generated metadata to generate a metadata result set, wherein the generated metadata result set includes metadata specifying a path to the data in the non-relational database, and wherein generating the metadata result set includes combining a plurality of indexes in response to the query, wherein combining the plurality of indexes includes combining the plurality of indexes using one or more bitwise operations on the plurality of indexes;
    generating, by the computing device, a result set including data in the non-relational database using the plurality of indexes of the generated metadata result set including retrieving the data in the non-relational database from one or more devices included within one or more data centers located in at least one remote geographical location using the metadata result set; and
    transmitting, by the computing device, the result set to a requesting client, wherein the result set includes copies of the data.

2. The computer-implemented method of claim 1, wherein the generated metadata includes one or more full text indexes of the data stored in the non-relational database.

3. The computer-implemented method of claim 1, further comprising receiving the query over a switched fabric communication link.

4. The computer-implemented method of claim 1, further comprising:
    transferring, by the computing device, the data to a shard of the non-relational database on a second computing device; and
    generating, by the computing device, metadata of the transferred data.

5. The computer-implemented method of claim 1, further comprising:
storing, by the computing device, a database schema associated with a first instance of the non-relational database to a file; and
generating, by the computing device, a second instance of the non-relational database based upon the database schema.

6. A computer program product residing on a computer readable medium having a plurality of instructions stored thereon which, when executed by a processor, cause the processor to perform operations comprising:
generating metadata associated with data stored in a non-relational database, the metadata based upon, at least in part, at least one of a location of the data, a state of data, and the data;
storing the generated metadata in a data structure in memory;
inspecting the generated metadata for updates;
updating the data stored in the non-relational database based upon, at least in part, the updates of the generated metadata;
receiving a query for data stored in the non-relational database;
executing the query using the generated metadata to generate a metadata result set, wherein the generated metadata result set includes metadata specifying a path to the data in the non-relational database, and wherein generating the metadata result set includes combining a plurality of indexes in response to the query, wherein combining the plurality of indexes includes combining the plurality of indexes using one or more bitwise operations on the plurality of indexes;
generating a result set including data in the non-relational database using the plurality of indexes of the generated metadata result set including retrieving the data in the non-relational database from one or more devices included within one or more data centers located in at least one remote geographical location using the metadata result set; and
transmitting the result set to a requesting client, wherein the result set includes copies of the data.

7. The computer program product of claim 6, wherein the generated metadata includes one or more full text indexes of the data stored in the non-relational database.

8. The computer program product of claim 6, further comprising receiving the query over a switched fabric communication link.

9. The computer program product of claim 6, further comprising:
transferring the data to a shard of the non-relational database on a second computing device; and
generating metadata of the transferred data.

10. The computer program product of claim 6, further comprising:
storing a database schema associated with a first instance of the non-relational database to a file; and
generating a second instance of the non-relational database based upon the database schema.

11. A computing system including a processor and memory configured to perform operations comprising:
generating metadata associated with data stored in a non-relational database, the metadata based upon, at least in part, at least one of a location of the data, a state of data, and the data;
storing the generated metadata in a data structure in memory;
inspecting the generated metadata for updates;
updating the data stored in the non-relational database based upon, at least in part, the updates of the generated metadata;
receiving a query for data stored in the non-relational database;
executing, by the computing device, the query using the generated metadata to generate a metadata result set, wherein the generated metadata result set includes metadata specifying a path to the data in the non-relational database, and wherein generating the metadata result set includes combining a plurality of indexes in response to the query, wherein combining the plurality of indexes includes combining the plurality of indexes using one or more bitwise operations on the plurality of indexes;
generating, by the computing device, a result set including data in the non-relational database using the plurality of indexes of the generated metadata result set including retrieving the data in the non-relational database from one or more devices included within one or more data centers located in at least one remote geographical location using the metadata result set; and
transmitting the result set to a requesting client, wherein the result set includes copies of the data.

12. The computing system of claim 11, wherein the generated metadata includes one or more full text indexes of the data stored in the non-relational database.

13. The computing system of claim 11, further comprising receiving the query over a switched fabric communication link.

14. The computing system of claim 11, further comprising:
transferring the data to a shard of the non-relational database on a second computing device; and
generating metadata of the transferred data.

15. The computing system of claim 11, further comprising:
storing a database schema associated with a first instance of the non-relational database to a file; and
generating a second instance of the non-relational database based upon the database schema.

16. A computer-implemented method comprising:
generating, by a computing device, metadata associated with data stored in a database, the metadata based upon, at least in part, at least one of a location of the data, a state of data, and the data;
storing, by the computing device, the generated metadata in a data structure;
inspecting, by the computing device, the generated metadata for updates;
updating, by the computing device, the data stored in the data structure based upon, at least in part, the updates of the generated metadata;
receiving, by the computing device, a query for data stored in the database;
executing, by the computing device, the query using the generated metadata to generate a metadata result set, wherein the generated metadata result set includes metadata specifying a path to the data in the database, and wherein generating the metadata result set includes combining a plurality of indexes in response to the query, wherein combining the plurality of indexes includes combining the plurality of indexes using one or more bitwise operations on the plurality of indexes;
generating, by the computing device, a result set including data in the database using the plurality of indexes of the generated metadata result set including retrieving the data in the non-relational database from one or more devices included within one or more data centers located in at least one remote geographical location using the metadata result set; and transmitting, by the computing device, the result set to a requesting client, wherein the result set includes copies of the data.

* * * * *